United States Patent [19]

Tregoning

[11] 4,452,343

[45] Jun. 5, 1984

[54] ROAD BRAKE SLACK ADJUSTER

[75] Inventor: Geoffrey R. Tregoning, Chippenham, England

[73] Assignee: Westinghouse Brake and Signal Company Ltd., Chippenham, England

[21] Appl. No.: 324,483

[22] Filed: Nov. 24, 1981

[51] Int. Cl.³ ............................................. F16D 65/56
[52] U.S. Cl. .......................... 188/79.5 K; 188/196 BA
[58] Field of Search ................... 188/79.5 K, 79.5 GE, 188/79.5 GT, 79.5 R, 79.5 GC, 196 BA, 196 B, 196 P, 196 D, 71.8; 185/71.2, 71.9; 192/111 A

[56] References Cited

U.S. PATENT DOCUMENTS

| 3,921,765 | 11/1975 | Swander, Jr. | 188/79.5 K |
| 4,121,703 | 10/1978 | Moss | 188/79.5 K X |

FOREIGN PATENT DOCUMENTS

| 1475516 | 6/1969 | Fed. Rep. of Germany | 188/79.5 K |
| 2731725 | 1/1978 | Fed. Rep. of Germany | 188/79.5 K |

*Primary Examiner*—Douglas C. Butler

*Attorney, Agent, or Firm*—Larson and Taylor

[57] ABSTRACT

A road brake automatic slack adjuster mechanism having input and output members each pivotable about a common axis to apply and release a brake-applying force. These two members are interconnected by a force-transmitting member which, on the one hand, is threadedly engaged with the output member and, on the other hand, is releasably clutched to the input member. To effect slack adjustment, the mechanism includes brake-clearance determining device settable to predetermine the required brake clearance. This brake-clearance determining device includes a stepless clutch which interconnects the brake-clearance determining device and the output member. The clutch is released upon pivotal movement of the output member in a brake-force applying direction, equating with the required brake-clearance to allow the clutch to slip during movement of the output member corresponding to excessive clearance. Upon the return stroke, the clutch is re-engaged so that pivotal return movement of the output member is limited by the brake-clearance determining device while the input member is allowed fully to return to its initial position.

16 Claims, 3 Drawing Figures

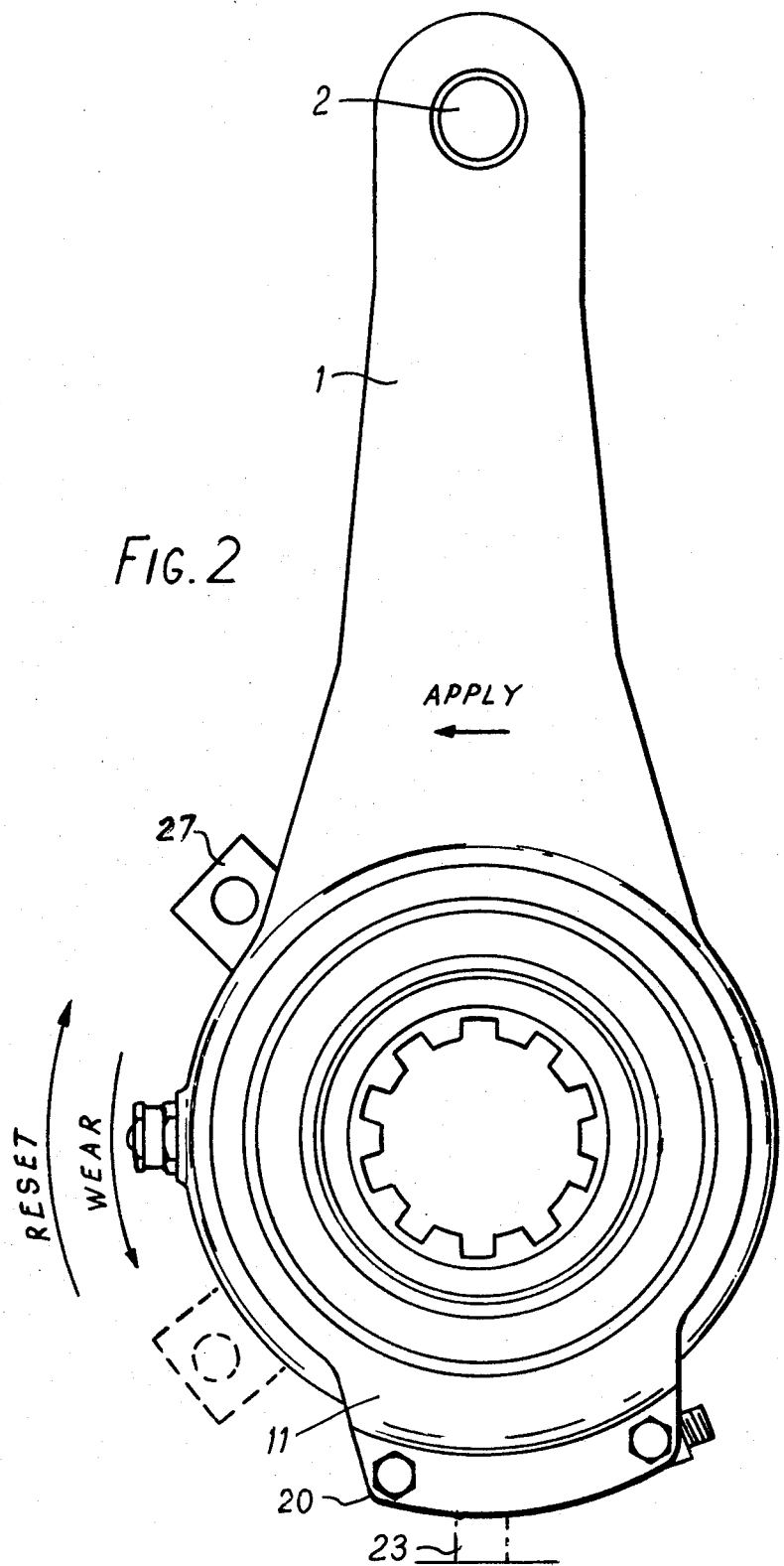

ROAD BRAKE SLACK ADJUSTER

This invention relates to automatic slack adjuster mechanisms and, particularly but not exclusively, to such mechanisms for heavy road vehicles.

Conventionally, one form of road brake slack adjuster comprises an input member in the form of an actuating lever which operates an internally-splined output member which, in operation, is engaged on a splined shaft which operates the actuating cams of the vehicle's brake shoes. In one particular form of an automatic version of such a brake slack adjuster, the brake-applying force is transmitted from the input member to the output member via a force-transmitting member which, on the one hand, is engaged with the input member through inter-engaged threads one on each of the input member and the force-transmitting member and, on the other hand, through toothed clutch faces one on the force transmitting member and the other on the output member. Automatic slack adjustment is effected by brake-clearance determining means by which the required normal brake clearance is set. These brake clearance determining means includes a second jaw of toothed clutch faces one of which is carried by the output member and the other of which is carried by a part of the brake clearance determining means.

This arrangement suffers the disadvantage that slack adjustment is achievable only in incremental steps the size of which is determined by the size of the teeth on the second pair of clutch faces. The present invention seeks to obviate this disadvantage and, in so doing, affords additional advantages.

Accordingly, the present invention provides an automatic slack adjuster mechanism including an input member pivotable in opposite directions about an axis to apply and release respectively a brake-applying force; an output member also pivotable in opposite directions about the axis to transmit said force to brake applying means; a force transmitting member threadedly engaged around the output member and having a clutch face engaged with a corresponding clutch face on the input member, the threaded engagement of the force transmitting member and the output member being of such a sense that pivotal movement of the input member in a direction to apply a brake-applying force tends, by the force transmitting member being rotated with the input member through the two clutch faces, further to engage the two clutch faces and thereby move the inut member in a first axial direction with the force transmitting member and pivotal movement of the input member in the opposite direction to release the brake-applying force tends, by the force transmitting member being rotated with the input member through the two clutch faces, to release the two clutch faces to permit the input member in an opposite axial direction with the force transmitting member; and brake-clearance determining means having a first part with respect to which the output member is rotatable about the axis and a second part normally engaged with the output member through a stepless clutch of which one part is located with respect to said second part and of which the other part of the clutch is located with respect to the output member; the stepless clutch being retaind engaged by movement of the input member in the first axial direction and being disengaged by movement of the input member in the opposite axial direction.

The clutch face on the input member may be formed on a radially inwardly projecting portion of the input member. With such an arrangement, the clutch face on the input member may be provided on one side of said portion, an opposite side of said portion then constituting a stop face opposed to and abuttable with a stop face provided on the output member.

There may be provided spring means urging the force transmitting member in said first axial direction thereby resiliently to urge the two clutch faces into engagement.

Spring means may also be provided operative between the input member and the output member urging the input member in said opposite axial direction with respect to the output member thus resiliently to urge the two clutch faces into engagement.

Re-setting means may be provided by which the mechanism can be re-set after renewal of the wearing surfaces of a brake of a vehicle to which the mechanism is fitted. Then re-setting means may include means by which the force-transmitting means can be moved in said opposite axial direction to allow the input member to move also in that direction thereby to disengage the stepless clutch.

One embodiment of the present invention will now be described in greater detail, by way of example only, with reference to the accompanying drawings of which:

FIG. 2 illustrates a side view of the mechanism of FIG. 1.

Figure 1:
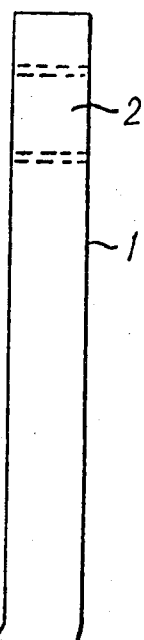
FIG. 1 illustrates a part sectional view of a vehicle brake lever including a slack adjusting mechanism.

Referring to FIG. 1, the brake lever has an input member or lever arm 1 with an eye 2 for coupling by a clevis to a brake operating linkage and an actuator. The lever arm 1 has a central hub portion 3 and constitutes an an input member containing co-axially therewith a splined output member 4. The input member is coupled to the output member 4 by a force transmission member 5 which has an annular toothed clutching face 6 engageable with a corresponding clutching face 7 of the member 3. The member 5 also is threadedly engageable with the outer surface of the member 4 by virtue of helical threads the sense of which is such that on movement of the eye 2 out of the drawing as viewed in FIG. 1, the member 5 tends to be urged in a leftward direction by virtue of reaction imparted via the output member 4. Correspondingly, movement of the arm 1 into the drawing as viewed in FIG. 1, tends to disengage the toothed clutching faces 6 and 7. The clutching face 6 is formed on an inward projection 8 within the hub 3 and an opposite face of the projection 8 is engageable with an outward tapered flange 9 of the output member 4 which thereby forms a positive stop for leftward movement of the input member 3 relative to the output member 4.

The output member 4 is provided with a multiplate clutch denoted generally by the reference 10 by which it is coupled to a clearance control member 11. The multiplate clutch 10 has a first group of plates 16 keyed to an outer cylindrical surface of output member 4 and a second group of plates 17 keyed to a member 11a and intersperses between the plates 16. The members 11, 11a are together rotatably supported but constrained against axial movement by a retaining member 11b. The retaining member 11b has a radially inwardly extending wall, rotatably engaging an annular recess defined between the members 11, 11a with an outer cylindrical rim formed at its open end to engage lockingly with an annular groove on the outer diameter of hub portion 3. The groups of plates 16 and 17 are constrained against rightward movement by an outer pressure plate 14 keyed to an outer cylindrical surface of member 4 and retained thereon by a circlip 18.

The groups of plates 16 and 17 are urged by springs 12 into engagement with each other via an inner pressure plate 13 which is slideably keyed to the outer cylindrical surface of member 4. Springs 12 are trapped by a shoulder on the outer cylindrical surface of 4, the whole clutch assembly being retained by circlip 18.

Further lighter springs 15 act between a shoulder on the right-hand side of the force transmission member 5 and the clutch springs 12. These springs 15 serve to bias the force transmitting member 5 into clutching engagement with projection 8 via the toothed faces 6 and 7. Reaction to the biassing force of the springs 15 is provided by an internal circlip 19 engaged in an annular groove in hub portion 3. The circlip 19 abuts a thrust washer 19a which bears on an annular area of the inner pressure plate 13 outwardly of member 11a and which is relatively rotatable thereto. Leftward movement of hub 3 is thus prevented by the springs 12 in the absence of any braking force on lever arm 1 and a small axial clearance 34 is maintained between the left face of projection 8 and the flange 9.

Figure 1A:
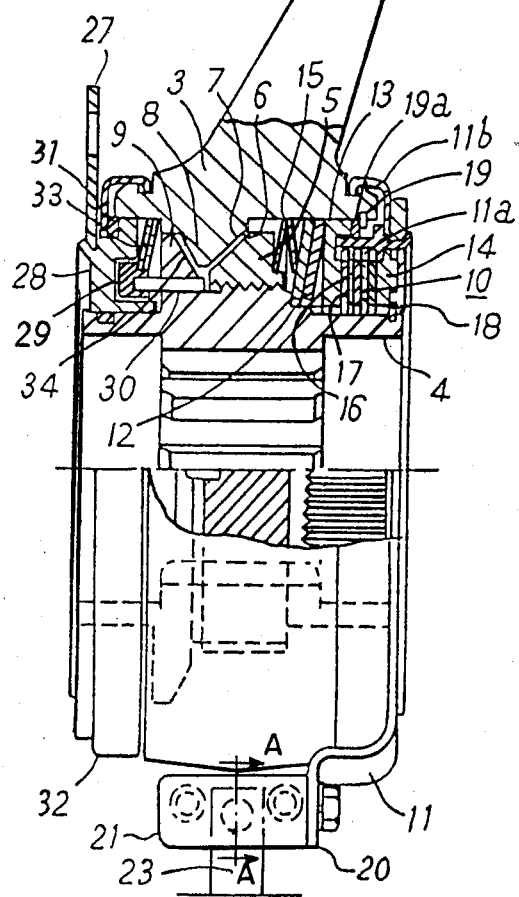
FIG. 1a is a partial cross sectional view taken on line A—A of FIG. 1, of a stop assembly housing forming part of the slack adjusting member.

The clearance control member 11 is more clearly visible by reference also to FIG. 2 and it will be seen that this constitutes a plate carried on the side of the central hub, the lower projection 20 of which carries a stop assembly housing 21. Again, the stop assembly housing is more readily appreciated from the inset part-section at FIG. 1a on the line A—A in FIG. 1 and it will be seen that this co-operates with a chassis-mounted projection 23. The housing 21 carries a spring-loaded plunger 24 urged by a spring 25 and is provided with an adjusting screw 26.

Reverting to FIG. 1, the slack adjuster is also provided with a reset mechanism and wear indicator lever. This lever is indicated by reference 27 and is carried by a rotary cam plate device 28 which is provided with co-operable cam follower means 29 which are operable to actuate three equally spaced pins 30 (of which one only is shown in FIG. 1) to urge the member 5 in a rightward direction upon rotation of the member 27.

Leftward force acting on the cam plate device 28 is reacted by thrust washer 31. Washer 31 is retained relative to hub 3 by a retaining member 32 which has a similar shape to retaining member 11b. Springs 33 act to urge co-operating faces of cam elements 28, 29 into mutually centralising engagement. By virtue of this coupling of the cam elements and the keying effect of pins 30, lever 27 is, during normal braking operations constrained to rotate with output member 4.

Referring now to the operation of the mechanism shown in FIGS. 1 and 2, assuming that the splined output member 4 is mounted on a spline of a cam operating shaft of a brake mechanism and that the eye 2 is coupled to an actuator linkage through a clevis pin, operation of the actuator will cause movement of the lever arm 1 outwardly of the drawing as viewed in FIG. 1. Such rotary movement of the hub portion 3 causes corresponding rotation of the force transmission member 5 by virtue of the mutual coupling of the faces of 6 and 7 because of initial engagement due to the force of the bias springs 15 acting leftwards on the force transmission member 5. The reaction, albeit initially light, which is exerted via the output member 4 causes the force transmission member 5 to be urged even more strongly towards the input member by virtue of the sense of the helical threads interconnecting the output member and the force transmitting member 5. All parts within the hub assembly move together as though a solid unit until the clearance set between the chassis-mounted projection 23 and the left-hand end (as viewed in FIG. 1a) of the stop assembly housing 21 is taken up. Thereafter the member 11 joins with the output member 4 in contributing to the reaction presented to any further movement of the input member 1. If the movement of the hub portion 3 produced so far has not resulted in taking up of the clearance between the brake shoes and the brake drum, this reaction increases to a point at which it results in a leftward force exerted by virtue of the helical threads between the output member 4 and the force transmitting member 5 acting leftwardly on the input member 1. Such a leftward force on the input member 1 tends both to decrease the clearance between the projection 8 and the flange 9 partially to release the multi-plate clutch 10 permitting slipping of the clutch and movement of the output member 4 in relation to the clearance control means 11. As soon as the full brake resistance is met by virtue of the brake shoes coming into full engagement with the brake drum, the reaction increases until leftward movement of the hub 3 is arrested by solid abutment of projection 8 and flange 9. Such continued leftward movement of the hub 3 also now fully releases the clutch 10. The abutment of projection 8 and the flange 9 prevents any further leftward movement of hub 3 and thereby permits the full force of the lever 1 to be applied directly through the force transmitting member 5 to the output member 4, by the continued engagement of the toothed faces 6 and 7 and the engaged helical threads on the force transmitting member 5 and the output member 4.

Upon release of the brake, the lever 1 moves inwardly of the drawing as viewed in FIG. 1 and as soon as the brake force reaction reduces to a value indicating that the drum distortion and resilience of the brake shoes etc. has been released, the reaction acting through the lever 1 is reduced to a level at which the lever 1 is permitted to return rightwardly relative to the output member under the influence of the clutch springs 12 and the multiplate clutch 10 re-engages such that subsequent movement of the output member 4 is accompanied by corresponding movement of the clearance control member 11 until a point is reached at which the output member 4 has moved through the the predescribed clearance as set by the clearance control means. At this point, the clearance conrol member 11 is stopped by abutment of the projection 23 with the plunger 24. Arrest of the return movement of the clearance control member 11, by virtue of the now re-engaged clutch 10, also arrests any further return movement of the output member 4. Thus, continued return movement of the arm 1 by virtue of the threaded engagement of the output member 4 and the force transmitting member 5 causes member 5 to move rightwardly relative to the output member 4. Such movement disengages the toothed faces 6 and 7. The lever 1 is thus permitted to return to its starting position leaving the output member 4 at a position corresponding to a fixed brake clearance. The springs 15 positively re-engage the toothed faces 6 and 7 immediately on cessation of return movement of lever 1.

When the wear indicator lever 27 has moved counterclockwise (as viewed in FIG. 2) with output member 4 to a position predetermined to indicate that the brake linings require replacing, the braked wheels and drums are removed and the shoes replaced with suitable replacements. In order to return the automatic adjuster mechanism to its initial condition it is then only necessary to exert a clockwise force on the lever 27 as seen in FIG. 2. The cam plate device 28 to which the lever 27 is fixed has three equispaced V-shaped depressions into which the V-shaped projections of the follower means 29 normally extend. Upon movement of the member 27 in a clockwise direction, since the follower means 29 is keyed to the output member 4 by the pins 30 and since the output member 4 is prevented from rotating by virtue of engagement of clutch element 10, pins 30 are urged rightwards as seen in FIG. 1 to urge the force transmitting member 5 rightward against springs 15 and the threads on the output member 4 and the force transmitting member 5. Such movement of the pins 30 thereby uncouple the toothed faces 6 and 7. Further clockwise movement of lever member 27 relative to the output member 4 takes up the clearance between the cam follower 29 and the flat face of flange 9. Continuing clockwise movement of member 27 causes a build-up of a left-ward urging force which is reacted by the thrust washer 31 through member 32 into hub 3 tending to offset the loading due to springs 12 on the clutch 10. When a force balance is achieved clutch plates 17 slip relative to plates 16 thus permitting the output member 4 together with the brake cam shaft to be returned to a re-set position. The removal of turning force from lever 27 results in immediate re-engagement of both clutches in fully brake effective mode.

Modifications of the arrangement described will be apparent to skilled persons within the general concepts of the invention.

For example, in some applications the resetting means may not be required. In such a case it would merely be necessary for the service mechanic to move the assembly position on the cam shaft splines when relining the brake, or alternatively the input clevis pin could be removed temporarily from input member 1, when the lever could be operated freely and rapidly through several partial rotations in the manner of a ratchet wrench, thus continuing rotation of the brake cam shaft in an application direction beyond the fully worn position through the remaining arc of circle to reset position. Further, if a fixed clearance is acceptable with no means for adjustment the clearance sensing means may easily be simplified. In certain applications of the invention it may be more convenient not to include the earth member 23. In order to avoid the need for a member 23 in association with the clearance control member it may be arranged that the latter has a radial extension approximately parallel to the line of action of the connection at 2, said extension being connected via a pivotted link having a predetermined lost motion to a point on the line of action at 2 and outward from 2. This arrangement therefore forms with the lever 1 a trapezium, the diagonal of which through 2 increases in a brake application and the lost motion thereby determines a fixed clearance as before.

Having thus described our invention what we claim is:

1. An automatic slack adjuster mechanism including an input member pivotable in opposite directions about an axis to apply and release respectively a brake-applying force; an output member also pivotable in opposite directions about the axis to transmit said force to brake applying means; a force transmitting member threadedly engaged around the output member and having a clutch face engaged with a corresponding clutch face on the input member, the threaded engagement of the force transmitting member and the output member being of such a sense that pivotal movement of the input member in a direction to apply a brake-applying force tends, by the force transmitting member being rotated with the input member through the two clutch faces, further to engage the two clutch faces and thereby move the input member in a first axial direction with the force transmitting member, and pivotal movement of the input member in the opposite direction to release the brake-applying force tends, by the force transmitting member being rotated with the input member through the two clutch faces, to release the two clutch faces to permit the input member to move in an opposite axial direction with the force transmitting member; and brake-clearance determining means having a first part with respect to which the output member is rotatable about the axis and a second part normally engaged with the output member through a stepless clutch of which one part is located with respect to said second part and of which the other part of the clutch is located with respect to the output member; the stepless clutch being disengaged by movement of the input member in the first axial direction and being retained engaged by movement of the input member in the opposite axial direction.

2. A mechanism as claimed in claim 1, wherein the clutch face on the input member is formed on a radially inwardly projecting portion of the input member.

3. A mechanism as claimed in claim 2, wherein the clutch face on the input member is provided by a face on one side of said portion and an opposite side of said portion constitutes a stop face opposed to and abuttable with a stop face provided on the output member.

4. A mechanism as claimed in claim 1 wherein the two clutch faces have interengaging teeth.

5. A mechanism is claimed in claim 1 having spring means urging the force transmitting member in said first axial direction thereby resiliently to urge the two clutch faces into engagement.

6. A mechanism as claimed in claim 1 having spring means operative between the input member and the output member urging the input member in said opposite axial direction with respect to the output member thus resiliently to urge the two clutch faces into engagement.

7. A mechanism as claimed in claim 1 wherein the second part of the brake-clearance determining means is mounted on the input member for rotation about said axis with respect to the input member upon disengagement of the stepless clutch.

8. A mechanism as claimed in claim 1 wherein the first part of the brake-clearance determining means is a part fixed in relation to a vehicle on which the mechanism is mounted.

9. A mechanism as claimed in claim 1 wherein the second part of the brake-clearance determining means includes spaced stop faces between which projects the first part of the brake-clearance determining means.

10. A mechanism as claimed in claim 9, wherein the distance between the spaced stop faces is adjustable.

11. A mechanism as claimed in claim 1 wherein there is also provided re-setting means by which the mechanism can be re-set after renewal of the wearing surfaces of a brake of a vehicle to which the mechanism is fitted.

12. A mechanism as claimed in claim 11, wherein the re-setting means includes means by which the force-transmitting means can be moved in said opposite axial direction to allow the input member to move also in that direction thereby to disengage the stepless clutch.

13. A mechanism as claimed in claim 12, wherein the means by which the force-transmitting means can be so moved is a plurality of pins.

14. A mechanism as claimed in claim 13, wherein one end of each pin is engageable with the force-transmitting means and the opposite end is engaged with a cam surface movement of which moves the pins to move the force-transmitting means.

15. A mechanism as claimed in claim 14, wherein the cam surface is located with respect to the input member and is rotatable thereon about said axis.

16. A mechanism as claimed in claim 1 wherein said stepless clutch is annular.

* * * * *